United States Patent [19]

Schneider et al.

[11] 4,159,196
[45] Jun. 26, 1979

[54] APPARATUS FOR THE WET PURIFICATION OF GASES

[75] Inventors: Jürg Schneider, Muttenz; Volker Fattinger, Arlesheim, both of Switzerland

[73] Assignee: Ciba-Geigy Corporation, Ardsley, N.Y.

[21] Appl. No.: 810,543

[22] Filed: Jun. 27, 1977

[30] Foreign Application Priority Data

Jun. 30, 1976 [CH] Switzerland ............... 8391/76
Dec. 22, 1976 [CH] Switzerland ............... 16185/76

[51] Int. Cl.² ............................................. B01D 47/06
[52] U.S. Cl. .............................. 55/257 QV; 55/436; 55/444
[58] Field of Search ............ 55/90, 257 R, 257 QV, 55/257 MP, 436, 442, 443–446, 463, 415; 261/108, 111

[56] References Cited

U.S. PATENT DOCUMENTS

| | | | |
|---|---|---|---|
| 1,669,602 | 5/1928 | Danks | 55/446 |
| 1,989,774 | 2/1935 | Snow | 261/111 |
| 2,290,323 | 7/1942 | Graham | 55/436 |
| 2,599,139 | 6/1952 | Stevenson | 55/436 |
| 3,375,058 | 3/1968 | Petersen et al. | 55/442 |
| 3,599,398 | 8/1971 | Jaeger et al. | 55/220 |

FOREIGN PATENT DOCUMENTS

| | | | |
|---|---|---|---|
| 228428 | 9/1922 | Fed. Rep. of Germany | 55/443 |
| 2325413 | 9/1975 | France | 55/446 |
| 227414 | 9/1943 | Switzerland | 55/444 |
| 680868 | 10/1952 | United Kingdom | 55/90 |
| 1336924 | 11/1973 | United Kingdom | 55/90 |

*Primary Examiner*—Frank W. Lutter
*Assistant Examiner*—David L. Lacey
*Attorney, Agent, or Firm*—Harry Falber

[57] ABSTRACT

Apparatus for the wet purification of gases, in which a wash liquid is sprayed into a gas to be purified and the gas is then forced or drawn through a separating wall having passage slots. The gas flow is divided up by pairs of such slots into pairs of sub-flows inside the wall, the sub-flows of each pair being rapidly accelerated to at least 30 m per second and then made to rebound on one another in a zone which is common to a pair of slots which causes them to be sharply deflected after which they separate and are decelerated. The sub-flows are accelerated by the passage slot construction which narrows inwardly from the exterior of the wall. Preferably two pairs of slots are provided, one pair converging into the wall and another pair diverging from the wall, both pairs opening into the common zone which is in the form of an X, the narrowest points of the slots being in said zone. The total area of the zones relative to the area of the wall is at maximum 15%. The separating wall is constructed from individual profiled bars which are spaced apart to form the passage slots between them. The wall preferably consists of at least two sub-walls which are interconnected by a hinge.

12 Claims, 11 Drawing Figures

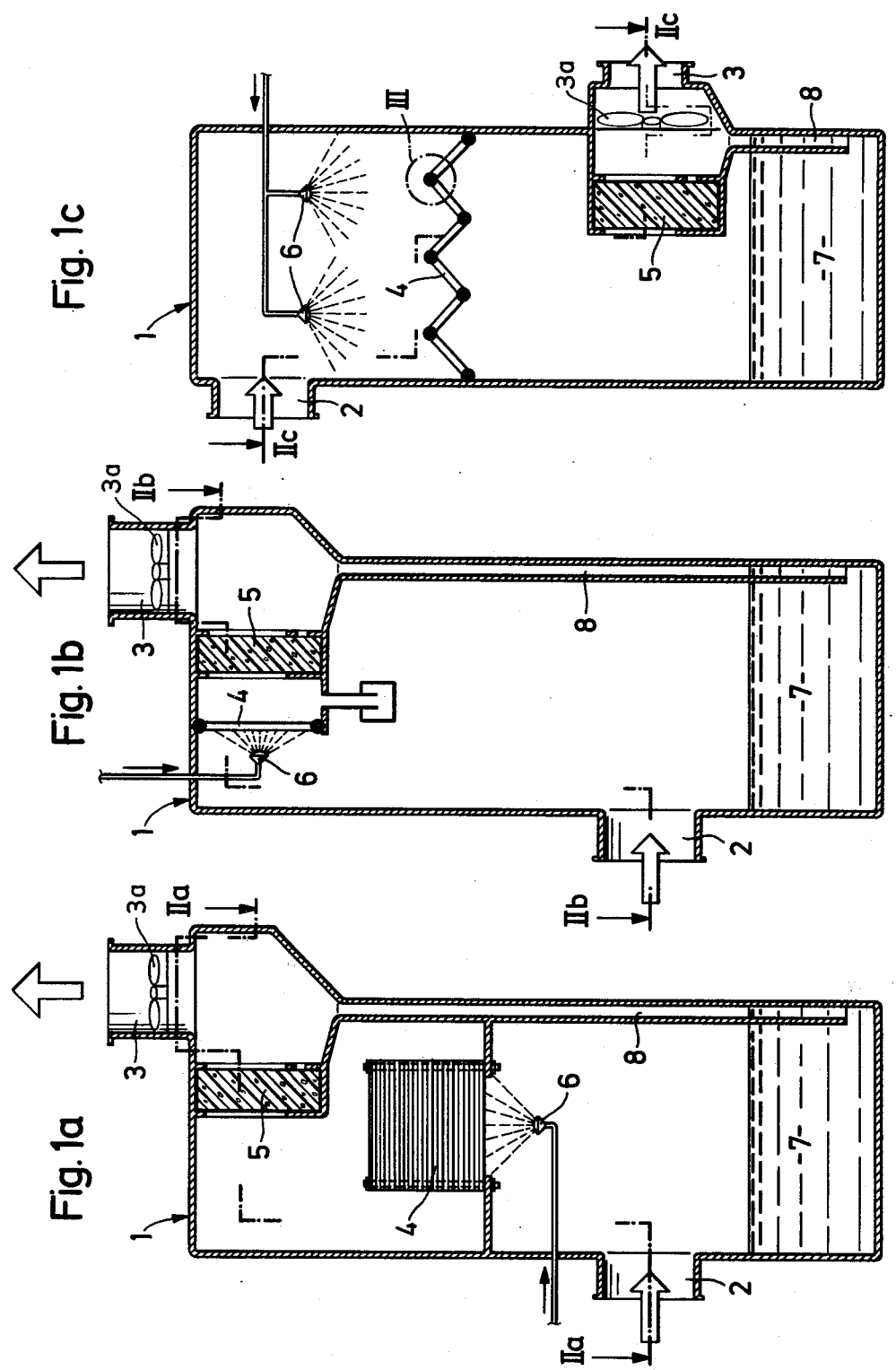

APPARATUS FOR THE WET PURIFICATION OF GASES

FIELD OF THE INVENTION

This invention relates to the wet mechanical separation of fine and ultra-fine particles and gaseous substances from a stream of gas, and relates more particularly to an apparatus for gas purification.

PRIOR ART

Gas purification methods are disclosed, for example, in French Pat. Nos. 1,040,508; 699,859; 699,860; 751,099; and German Utility Model No. 1,420,039. In some known processes, the gas to be purified is passed in counter-current with a wash liquid through a separator which includes a number of staggered rows of parallel bars extending transversely to the gas flow, the bars having a substantially rhombic or deltoid cross-section. As the gas flow enters the separator, it is divided up into sub-flows which are repeatedly deflected in serpentine form by the separator bars so that they collide with one another in pairs after each deflection.

The cross-section diagonals of the separator bars are usually longer in the direction of flow than transversely thereof, so that the serpentine paths of the sub-flows through the separator are relatively flat. The distances between each of the bars are such that the free flow cross-section of the separator is still about 40% to 60% of its total cross-section even at its narrowest points. In the separator, therefore, the sub-flows are accelerated to a maximum of about 2.5 times the gas flow velocity upstream of the separator, which with the conventional gas throughputs of about 2–5 m$^3$ per second and per m$^2$ entry area, is equivalent to an acceleration of about 12.5 m per second.

These known processes and gas purification apparatus are to some extent suitable for the wet separation of coarse-grain particles but with particles which are more difficult to separate, more particularly those of the order of magnitude of about or less than 1$\mu$, they are not very efficient.

In "Chemische Rundschau", No. 18, 1975, Switzerland and in U.S. Pat. No. 3,375,058, there is disclosed gas purification processes in which the gas is taken in sub-flows through a separating wall provided with curved slots narrowing sharply on either side from the outside towards the place of maximum curvature so that the sub-flows are accelerated, deflected, and decelerated after deflection. With these processes the separation efficiencies increase, giving a constant energy consumption, as the slot width decreases, i.e. as the sub-flow acceleration increases. However, narrower slots increase the risk of encrustation and hence clogging of the separator. Encrustation occurs particularly in the region of the most intensive curvature of the slots, where the maximum centrifugal forces are operative.

SUMMARY OF THE INVENTION

The process according to this invention combines the advantages of the latter methods and of the known methods mentioned hereinabove, without their disadvantages. More particularly, the method according to the invention gives maximum separation efficiencies and higher throughputs for the same energy consumption and minimum risk of encrustation.

The invention also relates to apparatus for performing the method, the apparatus having a separating wall in which pairs of passage slots are provided which converge in the form of a V in the direction of flow and open into one another in a common zone, and means for forcing or drawing the gas through said passage slots; wherein the slots narrow in the direction of the common zone in such manner that the total flow cross-section of the slots in the region of those openings is 15% maximum of the total wall area offered to the gas stream.

BRIEF DESCRIPTION OF THE DRAWINGS

Preferred embodiments of the invention will be explained in detail hereinafter with reference to the drawings wherein:

FIGS. 1a to 1c are vertical sections through three different embodiments of gas purifiers in accordance with this invention;

DETAILED DESCRIPTION OF PREFERRED EMBODIMENTS

Figure 2A:
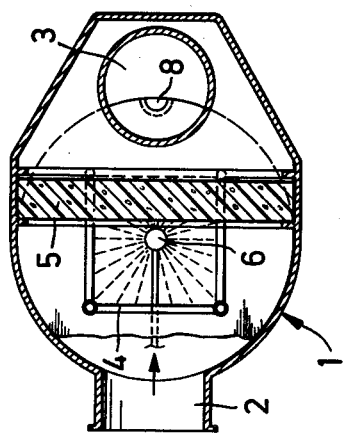
FIGS. 2a to 2c are sections on the lines IIa to IIa, IIb to IIb and IIc to IIc of FIGS. 1a to 1c respectively.

Apart from the specially constructed separating walls, the gas purifiers shown in FIGS. 1a to 1c are of conventional construction and comprise a tower 1 with an inlet 2 for gas to be purified, an outlet 3 for the purified gas and gas passing means 3a (depicted as a fan) for directing the gas through tower 1. Purification as used in this context denotes both the separation of solid and liquid particles and the separation of undesirable gaseous constituents. A separating wall 4 and a drip trap 5 are disposed in the tower 1 between the inlet 2 and the outlet 3 and the gas to be purified has to flow through them in that sequence. Upstream of the separating wall 4, one or more spray nozzles 6 are provided to spray a wash liquid into the stream of gas. A wash liquid sump 7 is provided at the bottom of the tower 1 and is connected to the output side of the drip trap 5 by means of a conduit 8. The trap 5 may, for example, be of the kind described in U.S. Pat. No. 3,925,040.

Figure 2B:
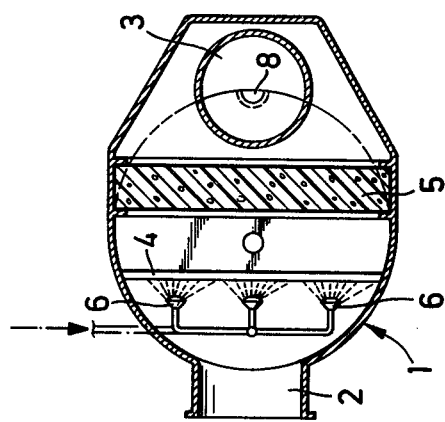
Figure 2C:
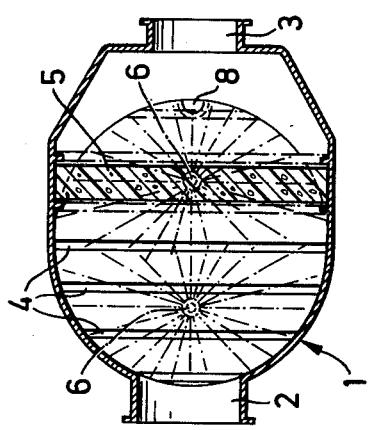

The difference between the three embodiments illustrated lies mainly in the arrangement of the separating walls 4 and the drip trap inside the tower 1. In the embodiment shown in FIGS. 1a and 2a, the separating wall 4 comprises four sub-walls hinged at the corners to form a box and the flow is from within outwards. The top of the "box" is closed by a cover (not shown). In the embodiment shown in FIGS. 1b and 2b, the separating wall comprises a sub-wall which is flat but in the third embodiment the separating wall comprises a number of sub-walls arranged in zig-zag formation.

Figure 3:
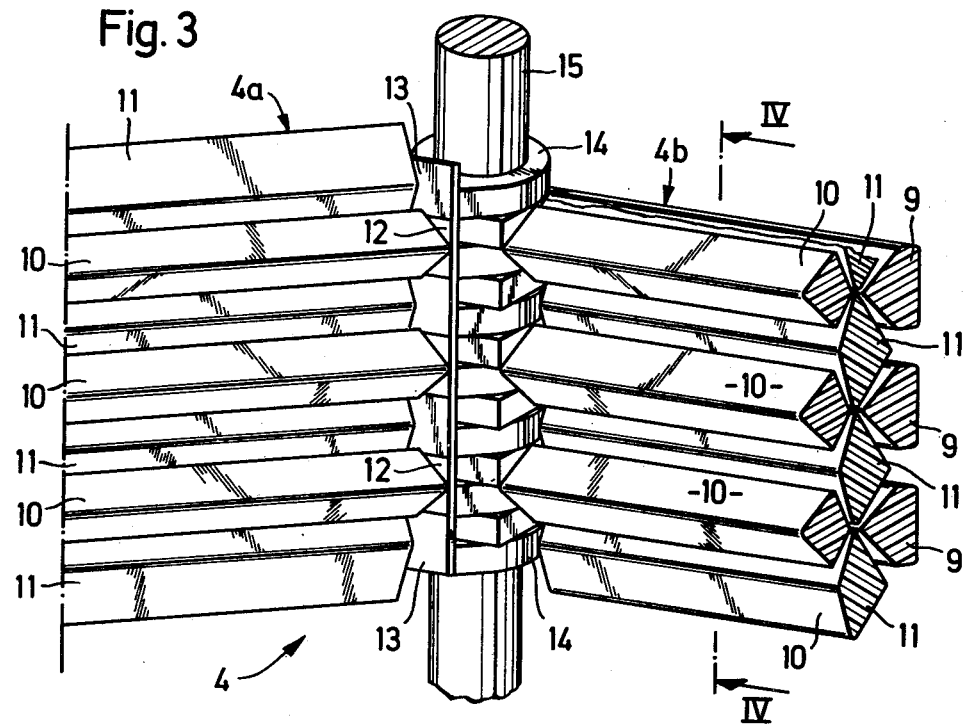
FIG. 3 shows the separating wall of the gas purifier of FIG. 1c to an enlarged scale.
Figure 4:
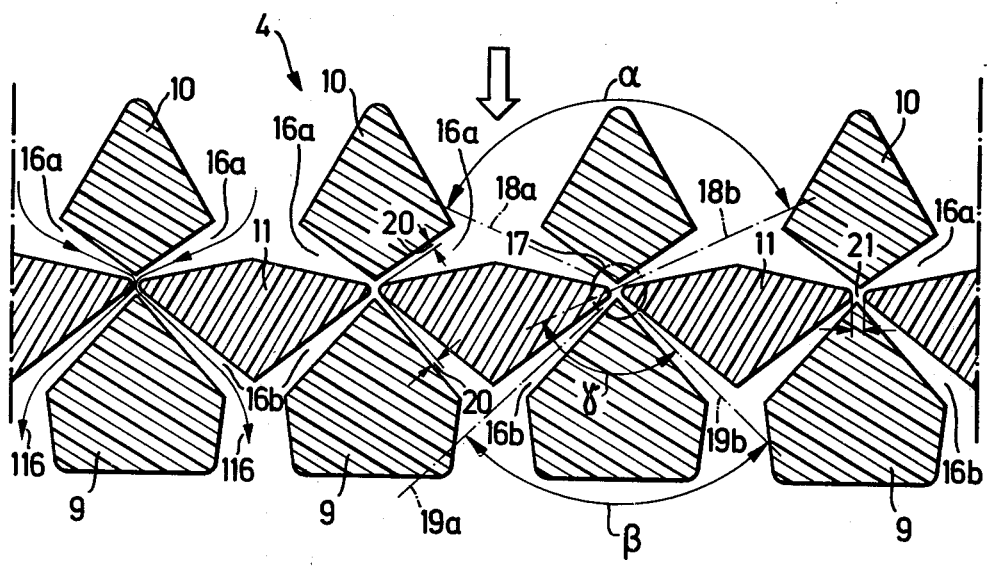
FIG. 4 shows the bars of the separating wall in cross-section on the line IV to IV of FIG. 3.

FIG. 3 is an enlarged view of part of the separating wall of the purifier shown in FIG. 1c. As mentioned above, the wall 4 comprises a number of sub-walls 4a, 4b which are interconnected by a hinge-pin 15, each sub-wall being constructed from a row of spaced plastics profiled bars 9, 10 and 11. The bars 9 and 10 have common end plates 12, which space them apart (FIG. 4). The bars 11 also have end plates 13 which space them from the pairs of bars 9, 10. Hinge rings 14 are fitted to, or are integrally connected with, the end plates 12 and 13. The individual profiled bars 9 and 10 are disposed side by side and one above the other alternating with the profiled bars 11 and are held together via the hinge rings 14 by means of the hinge pins 15.

Between the profiled bars in the separating wall 4, passage slots 16a and 16b are formed and during operation the gas to be purified is forced or drawn through these slots. The compression or drawing means required have been omitted from the drawing for the sake of clarity. The pairs of slots 16a and 16b taper inwardly in the form of a V to converge in the form of an X at the zone 17. As a result, gas passing through the slots in the wall 4 divides into sub-flows, the flow paths being shown by arrows 16. The sub-flows in pairs of converging slots 16a rebound on one another in the zones 17 and are thereby deflected to flow out through the slots 16b. Thus gas passing through a slot 16a changes direction markedly at the center of the zone 17 to pass out through a slot 16b, the gas flow being indicated by arrows 116. The sub-flow paths 116 thus have an intensive curvature at the center of the zones 17. The vigorous rebounding of the sub-flows in the intensively curved slot regions forming the zones 17 prevents particles from lodging in the narrow regions of these zones which are the most susceptible to clogging.

In order to achieve optimum purification and minimum encrustation, it has been found advantageous for the rebound angle α at which the sub-flow rebounds on one another, measured between the center lines or center planes 18a and 18b of the slots 16a on the inlet side, to be at least 15°, but preferably at least approximately 45°, although angles of about 90° to 170° may be used. Also, the outflow angle β at which the sub-flows separate again after rebounding on one another measured between the center lines or center planes 19a and 19b of the slots 16b on the outlet side should be at least 15° to 45°, but preferably about 90° to 160°. In every case, the deflection angle γ, i.e. the angle between the slot center lines upstream and downstream of the rebound zone, should be at least about 80° to 90°, preferably about 120° to 140°.

It has also been found advantageous for the passage slots 16a and 16b to narrow continuously inwardly from the exterior. The widths 20 of the slots as measured transversely of the main directions of flow and the longitudinal directions of the profiled bars immediately upstream and downstream of the center of the zones 17, i.e. at the narrowest points of the slots, should be less than 12 mm, preferably less than 6 mm, or even less than 2 mm. The width 21 at the center of a zone 17 should be between 0.5 to twice, preferably 0.7 to 1.4 times the sum of the widths 20 of a pair of converging slots 16a. The width 21 may, for example, be 2 mm, 6 mm or 12 mm maximum. The total gas flow cross-section of the slots at the center of the zones 17 is about 15% maximum of the total wall area offered to the gas stream although it can be as low as 2%.

The pressure difference between the entry and outlet side of the separating wall is adjusted so that the sub-flows in the slots are accelerated to speeds of at least about 30 m per second, preferably about 45 to 80 m per second and up to 110 m per second.

Figure 5:
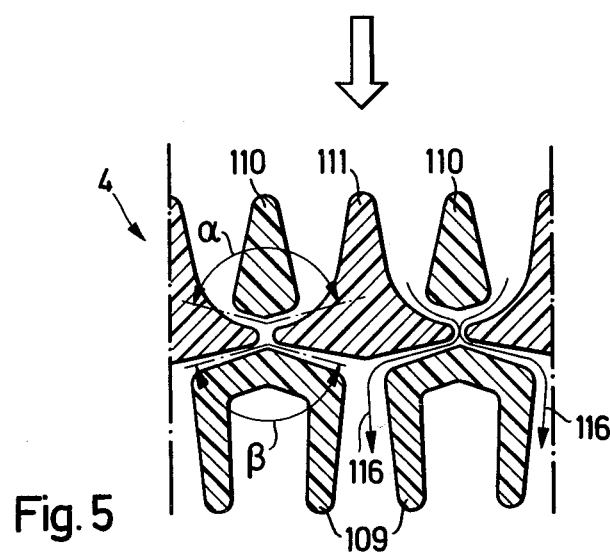
FIGS. 5 to 7 show cross-sectional views of different forms of the bar.
Figure 6:
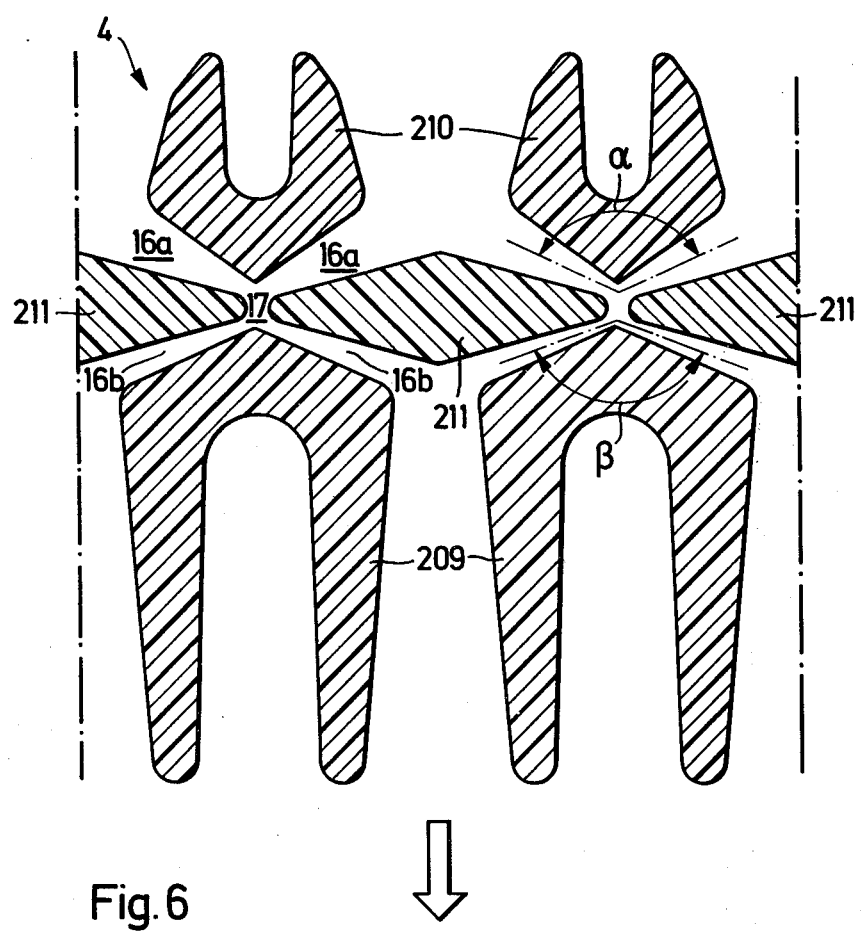

FIGS. 5 and 6 show cross-sections through separating walls which are slightly different from that shown in FIG. 4. These walls are also constructed from spaced apart profiled bars 109 to 111, 209 to 211. These profiled bars, however, have a somewhat different profile from those shown in FIG. 4. The function of these walls is the same as that of the wall as described with reference to FIG. 4.

In the above-described embodiments, only two sub-flows meet at any time within the separating walls. Of course more than two sub-flows could meet one another.

Figure 7:
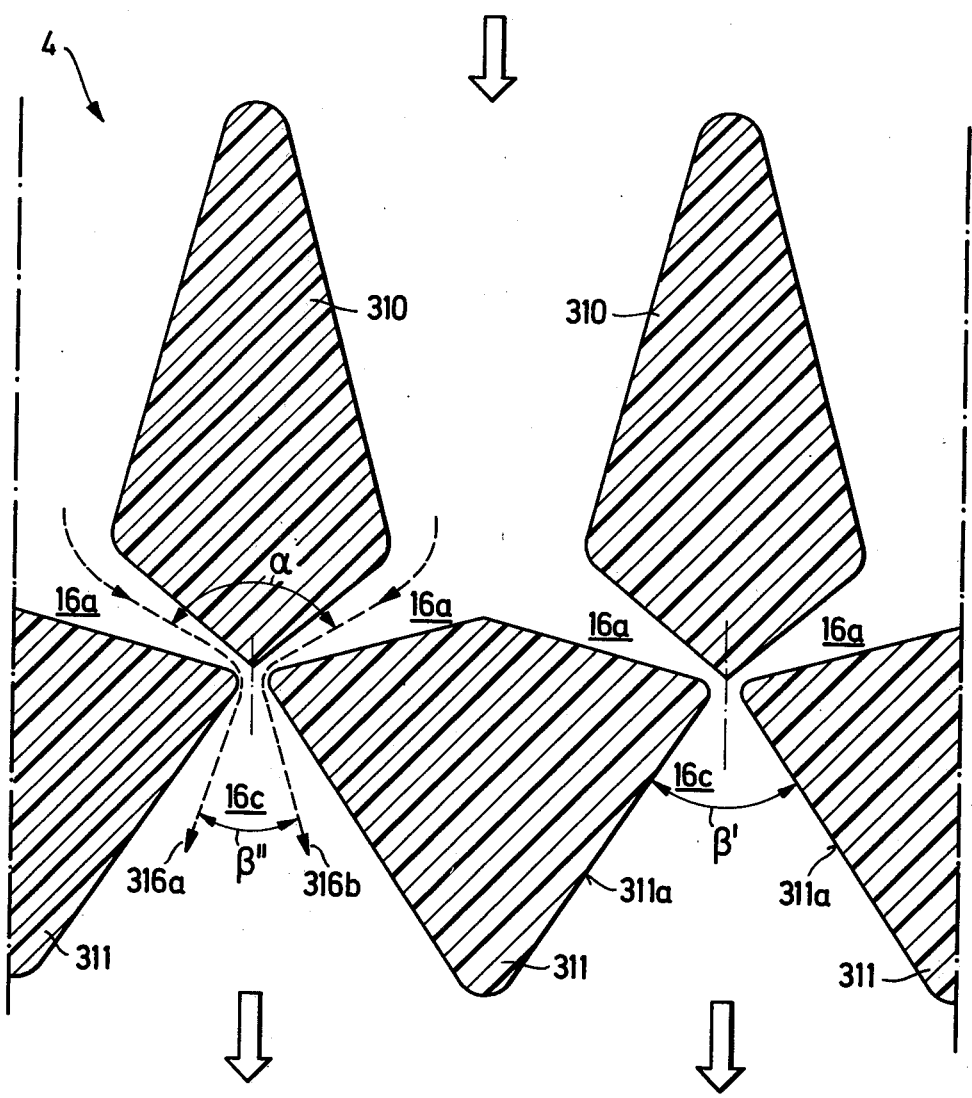

The separating wall illustrated in FIG. 7 may be used for very highly contaminated gases. Only two types of profiled bars are provided, i.e. the bars 310 and 311, which form passage slots 16a and 16c between them. Each pair of adjacent slots 16a converge in the form of a V and jointly lead into a slot 16c forming a Y-shaped central zone. It has been found that with this construction or arrangement of bars the build-up of encrustation at the narrow regions of the zones is prevented even under the most difficult conditions. With regard to the shape and dimensions of the slots, the same applies as in the preceding embodiments. The angle α in this embodiment can again be up to about 170°. The angle $\beta'$ between the boundary walls 311a of the profiled bars 311 may be in the range from about 20° to 150°, preferably about 60° to 80°. This is equivalent to a range of about 10° to 75° or 30° to 40° for the angle $\beta''$ between the main directions of the sub-flows 316a and 316b.

For special cases, the position of the profiled bars 310 in relation to the profiled bars 311 may be adjustable. This also applies to the other embodiments.

The construction of the separating walls 4 substantially reduces any encrustation of the passage slots. Consequently, the passage slots can be made much narrower and hence higher purification can be obtained for the same expenditure of energy. At the same time, the size of the separating walls can be greatly reduced for the same or even better separation efficiency, and this not only saves space but also reduces material costs. Also, with the form of separating wall described above, much higher gas throughputs can be obtained for the same expenditure of energy as compared with some walls disclosed in the prior art so that smaller walls can be used for a given gas throughput. For example, the gas can be accelerated to about 110 m per second in the passage slots, and in the case of a flat separating wall of the kind shown in FIG. 1b, for example, this is equivalent to a throughput per unit area of 2.5 to 6.5 m$^3$ per second m$^2$. In the devices disclosed in the U.S. Pat. No. 3,375,058, the velocities attainable are about 20 to 60 m per second, corresponding to throughputs of 1 to 3 m$^3$ per second m$^2$.

The hinge-like connection between the individual sets of profiled bars also contributes to reducing the space requirements. The zig-zag arrangement of these sets of profiled bars or wall portions enables a very considerable slot length to be obtained in the minimum amount of space, thus giving high efficiency.

What is claimed is:

1. Gas purification apparatus comprising housing means having inlet and outlet means, means for passing the gas through said housing means, a separating wall located in said housing means between said inlet means and said outlet means, and means positioned in said housing means upstream of said wall for spraying wash liquid into said gas stream, said separating wall having at least one first pair of slots converging in the direction of flow and opening into a common zone and at least one other slot diverging from said common zone in the direction of flow, each slot of said at least one pair of slots narrowing in the direction of convergence into the common zone such that the total flow cross-section of said at least one pair of slots in the region of the zone is 15% maximum of the total wall area offered to the gas stream.

2. Apparatus according to claim 1, wherein the center lines of said at least one pair of converging slots include an angle of at least 45°.

3. Apparatus according to claim 2, wherein the center lines include an angle of about 90° to 170°.

4. Apparatus according to claim 1, wherein the angle of divergence of the at least one other slot is at least 20°.

5. Apparatus according to claim 4, wherein the angle of divergence of said at least one other slot is at least 60° to 80°.

6. Apparatus according to claim 1, wherein the sum of the widths of said at least one first pair of slots immediately upstream of the respective common zone is about 0.5 to 2.0 times the width of the common zone.

7. Apparatus according to claim 1, wherein the total flow cross-section of the at least one first pair of slots in the zone is at least about 2% of the total wall area.

8. Apparatus according to claim 7, wherein the wall comprises spaced apart profiled bars forming said slots.

9. Apparatus according to claim 8 wherein the wall includes at least two pivotally interconnected sub-walls.

10. The apparatus according to claim 1, wherein said at least one other slot comprises a second pair of slots diverging from said common zone in the direction of flow, each slot of said second pair of slots widening continuously in said direction of divergence.

11. Apparatus according to claim 10, wherein the center lines of the diverging slots include an angle of at least 45°.

12. Apparatus according to claim 11, wherein the center lines of the diverging slots include an angle of about 90° to 170°.

* * * * *